United States Patent [19]

DeFrank

[11] Patent Number: 5,458,712
[45] Date of Patent: Oct. 17, 1995

[54] PROCESS FOR FORMING DRIP IRRIGATION HOSE WITH PRESSURE COMPENSATION

[75] Inventor: Michael DeFrank, Temecula, Calif.

[73] Assignee: T-Systems International, Inc., San Diego, Calif.

[21] Appl. No.: 242,292

[22] Filed: May 13, 1994

Related U.S. Application Data

[62] Division of Ser. No. 96,013, Jul. 21, 1993, Pat. No. 5,333,793.

[51] Int. Cl.⁶ ................................................. B29C 53/00
[52] U.S. Cl. .................... 156/203; 156/218; 156/244.11; 156/242; 264/210.1
[58] Field of Search ............................ 156/203, 218, 156/244.13, 244.18, 244.27, 252, 292, 242, 244.11; 264/210.1; 239/533.1, 542, 562, 566

[56] References Cited

U.S. PATENT DOCUMENTS

| | | | |
|---|---|---|---|
| 3,870,236 | 3/1975 | Sahagun-Barragan | 239/542 |
| 4,177,946 | 12/1979 | Sahagun-Barragan | 239/542 |
| 4,247,051 | 1/1981 | Allport | 239/542 |
| 4,254,791 | 3/1981 | Bron | 239/542 |
| 4,474,330 | 10/1984 | Langa | 239/542 |
| 4,984,739 | 1/1991 | Allport | 239/542 |
| 5,123,984 | 6/1992 | Allport et al. | 239/542 |

Primary Examiner—Michael W. Ball
Assistant Examiner—Richard Crispino
Attorney, Agent, or Firm—Christie, Parker & Hale

[57] ABSTRACT

A hose is made by continuously transporting a first strip of plastic film through an assembly station. One or more contiguous molten beads are deposited onto a central region of the film. The beads are formed into a flow regulating passage defined by side walls. A second strip of plastic film, which is narrower than the first strip of film, is sealed to the side walls while molten to form a flow regulating passage between the sidewalls and the first and second strips of film. Inlets to the flow regulating passage and outlets from the flow regulating passage are formed at spaced intervals along the hose. The first strip of film is longitudinally folded to overlap the margins and the overlapping margins are sealed to complete the hose.

10 Claims, 2 Drawing Sheets

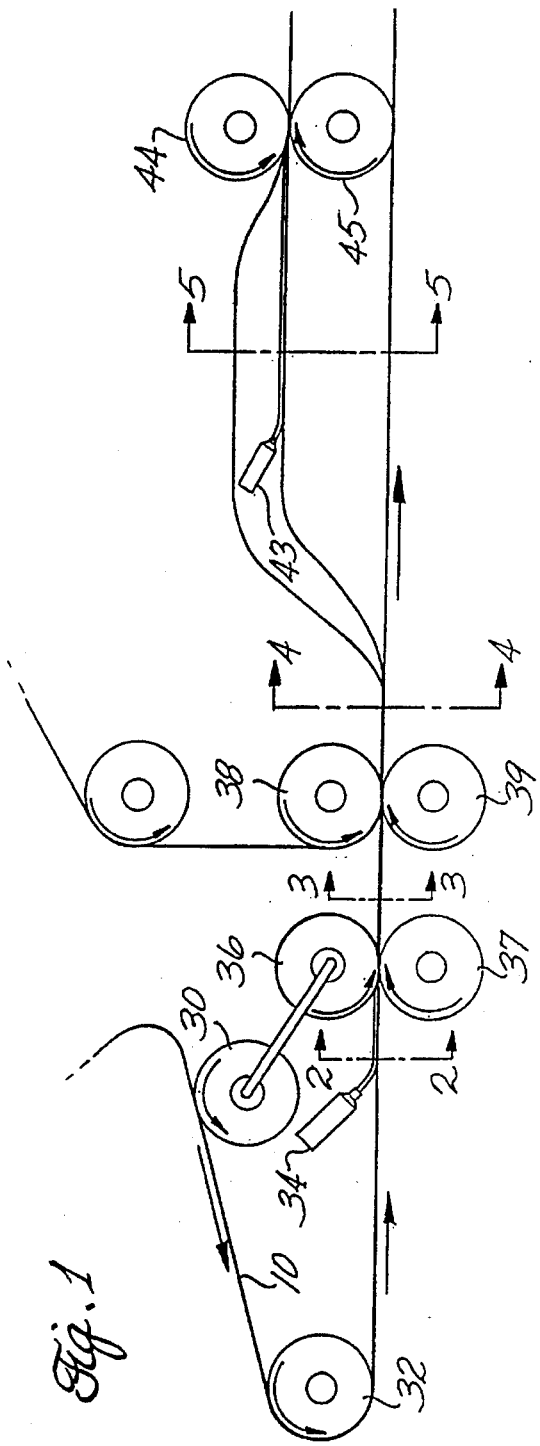
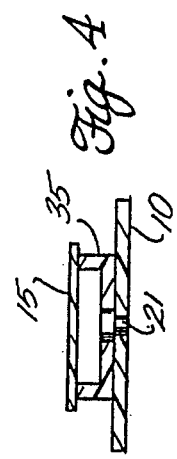
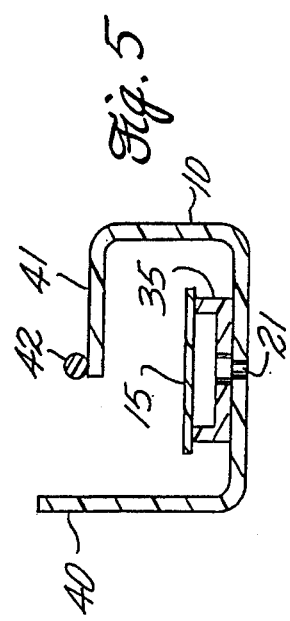
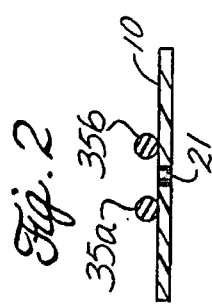
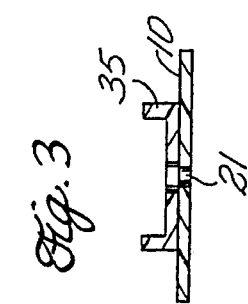

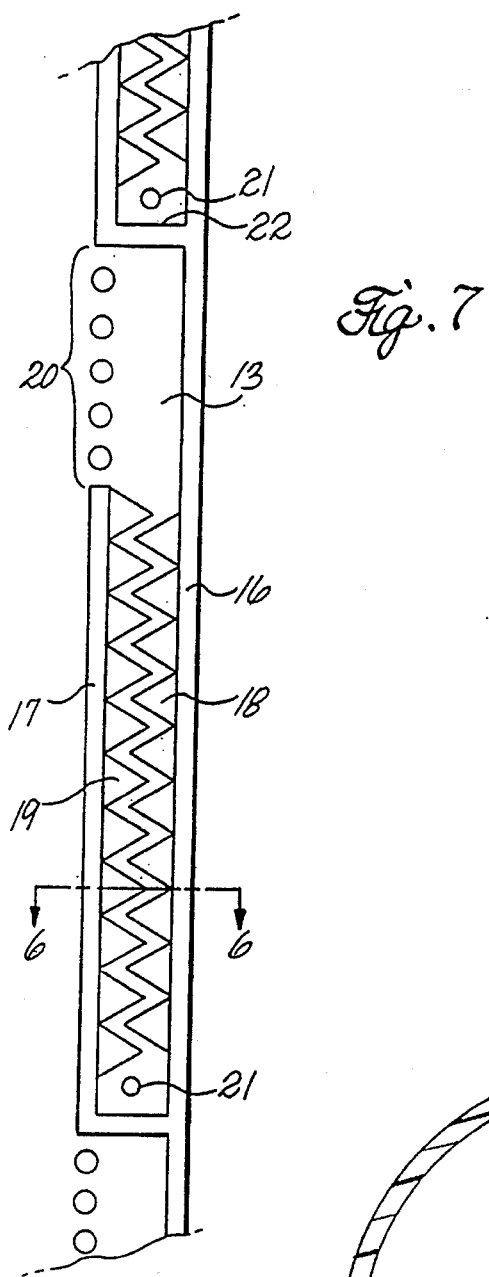
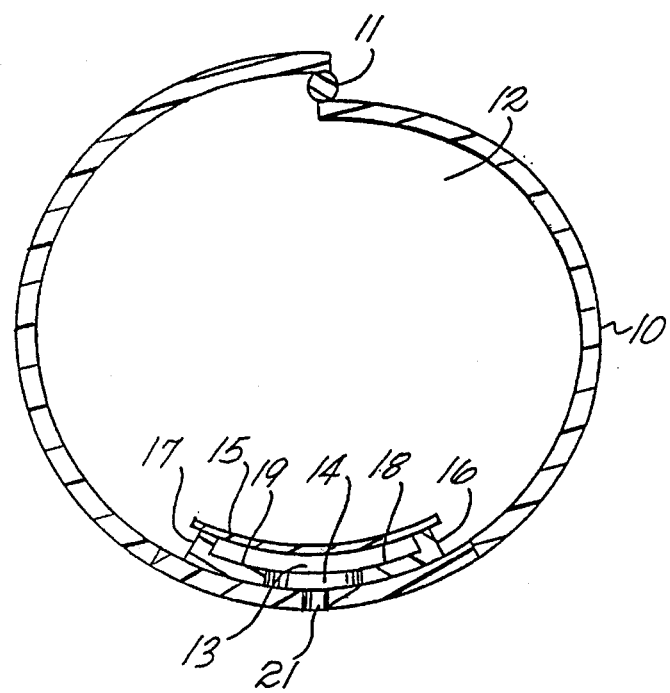

5,458,712

PROCESS FOR FORMING DRIP IRRIGATION HOSE WITH PRESSURE COMPENSATION

This is a division of application Ser. No. 08/096,013, filed Jul. 21, 1993, now U.S. Pat. No. 5,333,793.

BACKGROUND OF THE INVENTION

This invention relates to drip irrigation, and more particularly to a drip irrigation hose with pressure compensation and a method for its manufacture.

Drip irrigation hose can be classified as having either discrete emitters or continuous integral emitters. An example of discrete emitters is shown in U.S. Pat. No. 4,850,531. An example of continuous integral laminar flow emitters is shown in U.S. Pat. No. 4,247,051.

A design objective of drip irrigation hose is uniformity of the drip rate from each emitter. Since the water pressure in a drip irrigation system varies as a function of elevation of the field, it is customary to incorporate a pressure regulating mechanism into the emitters. Turbulent flow rate is less sensitive to pressure variation than laminar flow rate. Accordingly, it has been common practice for drip irrigation hose to employ serpentine flow regulating passages as continuous integral emitters to promote turbulent flow. An example of such drip irrigation hose is disclosed in U.S. Pat. No. 4,984,739.

SUMMARY OF THE INVENTION

According to one aspect of the invention, a laminar flow section and a turbulent flow section are formed contiguous to each other along the length of a flow regulating passage in a drip irrigation hose. Responsive to the pressure in a water supply passage of the drip irrigation hose, the cross-sectional area of the laminar flow section is reduced and directed toward the turbulent section with increasing pressure so as to compensate for the effect of pressure changes on the drip flow rate of the hose.

Preferably, the water supply passage is formed by a continuous strip of plastic film sealed together at its margin, and the flow regulating passage has longitudinal sidewalls extending inward from the strip. The base portion of the height of the sidewalls has sawtooth surfaces that form the turbulent flow section and the remainder of the height of the sidewalls has smooth surfaces that form the laminar flow section. The cross-sectional area of the laminar flow section is reduced by a continuous strip of deflectable plastic film that seals the sidewalls such that the smooth surfaces are adjacent thereto. The deflectable plastic film is deflected toward the sawtooth surfaces as the pressure increases to reduce the cross-sectional area of the laminar flow section.

According to another aspect of the invention, a drip irrigation hose is made by continuously transporting a first length of plastic film through a drip irrigation hose assembly station. One or more contiguous molten beads are deposited onto a central region of the film. The beads are formed into a flow regulating channel, primed by sidewalls. A second length of plastic film that is now within the first length of film, is sealed to the sidewalls while molten to form a flow regulating passage between the sidewalls and the first and second lengths of film. Inlets to the flow regulating passage and outlets from the flow regulating passage are formed at spaced intervals. The first length of film is longitudinally folded to overlap the margins and the overlapping margins are sealed to complete the hose.

BRIEF DESCRIPTION OF THE DRAWINGS

The features of a specific embodiment of the best mode contemplated of carrying out the invention are illustrated in the drawings, in which:

FIG. 1 is a schematic side view of apparatus for manufacturing drip irrigation hose incorporating principles of the invention;

FIG. 2 is a sectional view through plane 2—2 in FIG. 1;

FIG. 3 is a sectional view through plane 3—3 in FIG. 1;

FIG. 4 is a sectional view through plane 4—4 in FIG. 1;

FIG. 5 is a sectional view through plane 5—5 in FIG. 1;

FIG. 6 is a sectional view taken through a drip irrigation hose manufactured by the apparatus in FIG. 1; and FIG. 7 is a longitudinal section view taken through the flow regulating passage of FIG. 6.

DETAILED DESCRIPTION OF THE SPECIFIC EMBODIMENT

In FIG. 6 a continuous strip 10 of flexible water impervious plastic film is folded longitudinally so its margins overlap. The overlapping margins are sealed together by a molten plastic bead 11 made of compatible plastic material to form a hose. Alternatively, the margins of strip 10 could be heated and directly bonded together if desired. Typically, strip 10 is of the order of 4 to 15 mil in thickness. The interior surface of the hose defines a relatively large water supply passage 12. A much smaller flow regulating passage 13 is defined in part by a portion 14 of strip 10 and a thin continuous flow modulating strip 15 of plastic film. Strip 15 is more flexible than strip 10. Thus, strip 15 deflects more than strip 10 responsive to water pressure. Typically, strip 15 is thinner and/or more elastomeric than strip 10. By way of example, strip 15 could be 4 mil thick plastic film composed of 50% LLDPE and 50% thermoplastic elastomer. Molded plastic rails 16 and 17 extend inwardly from the surface of strip 10 to connect strip 10 to strip 15 along the length of the hose. Rails 16 and 17 have smooth straight interior surfaces. Molded plastic sidewalls 18 and 19 extend inwardly from the surface of strip 10 along the length of the hose, but are spaced from strip 15. Sidewalls 18 and 19 have adjacent saw toothed or chevron shaped surfaces that are designed to induce turbulent flow. The chevrons each have overlapping offset peaks (FIG. 7) so all the fluid flowing between sidewalls 18 and 19 must change direction at each peak. Sidewalls 18 and 19 therefore form a turbulent flow section along the length of flow regulating passage 13. The chevrons also have roots that are aligned with the smooth surfaces of rails 16 and 17. By virtue of the smooth surfaces of rails 16 and 17, the space between the top of sidewalls 18 and 19 and the surface of strip 15 defines a laminar flow section adjacent to and in fluid communication with the turbulent flow section. The plastic of strip 15, rails 16 and 17, and sidewalls 18 and 19 is also compatible with the plastic of strip 10.

As shown in FIG. 7, flow regulating passage 13 extends continuously along the entire length of the hose, but is preferably divided into segments that have a repeating pattern. Each segment has an inlet 20 formed by interruptions in rail 17 near one end of the segment and an outlet 21 formed in strip 10 near the other end of the segment. Outlet 21 could be a hole or a slit. A transverse end wall 22 separates inlet 20 of one segment from outlet 21 of the adjacent segment. End walls 22 are the same thickness as rails 16 and 17, both of which form a seal with strip 15. As a result, the only route for water flow from water supply passage 12 to outlets 21 is through the turbulent flow sections and the laminar flow sections of flow regulating passages 13.

As the pressure in water supply passage 12 increases, strip 15 is deflected toward the top surfaces of sidewalls 18 and 19 to reduce the space between strip 15 and sidewalls 18 and 19 and therefore the cross-sectional area of the laminar flow sections. This increases the ratio of turbulent flow to laminar flow, reduces the overall cross-sectional area of flow regulating passages 13, and tends to make the flow rate from the drip irrigation hose less dependent on pressure.

To manufacture the described drip irrigation hose at an assembly station shown in FIG. 1, continuous plastic strip 10 first passes an outlet forming station 30 where outlet slits or holes are made in the manner described in U.S. Pat. No. 5,123,984, the disclosure of which is incorporated fully herein by reference. Strip 10 is wrapped around a direction changing wheel 32, preparatory to passing an extruder 34, which deposits a pair of continuous molten plastic beads 35a and 35b on the interior surface of strip 10 on either side of outlets 21 (FIG. 2). Beads 35a and 35b and strip 10 pass through the nip of a pattern or rib forming wheel 36 and a backing wheel 37 while still molten to form rails 16 and 17, sidewalls 18 and 19, inlets 20, and transverse end walls 22, which are designated as a formed bead 35 (FIG. 3). Preferably, forming wheel 36 is mounted on the same shaft as the outlet forming wheel at station 30. Strip 15 is fed from a roll or bin into the nip of forming wheels 38 and 39 with strip 10 and formed bead 35 while still molten (FIG. 4) to bond strip 15 to rails 16 and 17 and end walls 22. After leaving the nip of form wheels 38 and 39, one margin of strip 10 is folded at a 90° angle by a film guide (not shown) in well known fashion and the other margin of strip 10 is folded 180° by a film guide to form a flat surface on which a continuous bead 42 is deposited by an extruder 43 (FIG. 5). Thereafter, the other margin is folded onto bead 42 and the resulting seam passes through the nip of form wheels 44 and 45 to complete the drip irrigation hose. Strip 10 is supported on a surface (not shown) during the described construction of the drip irrigation hose.

The described embodiment of the invention is only considered to be preferred and illustrative of the inventive concept; the scope of the invention is not to be restricted to such embodiments. Various and numerous other arrangements may be devised by one skilled in the art without departing from the spirit and scope of this invention.

What is claimed is:

1. A continuous method of making a drip irrigation hose at an assembly station comprising the steps of:

continuously transporting through the assembly station a first strip of plastic film having first and second longitudinal margins and a longitudinal central region between the margins;

depositing one or more continuous molten beads of compatible plastic onto the central region;

forming the one or more molten beads on the central region into a flow regulating channel defined by side walls;

sealing a second strip of plastic film that is narrower than the first strip of film to the side walls while the sidewalls are molten to form a flow regulating passage between the side walls and the first and second strips of film;

forming hose inlets to the regulating passage at spaced intervals along its length;

forming hose outlets from the regulating passage at spaced intervals along its length;

folding the first strip of film longitudinally to overlap the margins; and sealing the overlapping margins.

2. The method of claim 1, in which the second strip of film is more flexible than the first strip of film.

3. The method of claim 2, in which the second strip of film is thinner than the first strip of film.

4. The method of claim 2, in which the second strip of film is made from a material that is more elastomeric than the first strip of film.

5. The method of claim 2, in which the folding step causes the first strip of film to cover the second strip of film.

6. The method of claim 5, in which the inlets are formed in one of the side walls.

7. The method of claim 5, in which the outlets are formed in the first strip of film.

8. The method of claim 5, in which the side walls comprise outer rail portions that are sealed to the second strip of film and inner portions that are spaced from the second strip of film.

9. The method of claim 8, in which the outer rail portions are shaped to promote laminar flow.

10. The method of claim 9, in which the inner portions are shaped to induce turbulent flow.

* * * * *